US009015277B1

(12) United States Patent
Slavin et al.

(10) Patent No.: US 9,015,277 B1
(45) Date of Patent: Apr. 21, 2015

(54) DELIVERING PROMOTIONS ASSOCIATED WITH USER PROFILES THROUGH MULTIPLE DIGITAL CHANNELS ASSOCIATED WITH THE USER PROFILES

(71) Applicant: Codebroker, LLC, Belmont, MA (US)

(72) Inventors: Daniel Slavin, Belmont, MA (US); Pero Smrzlic, Leesburg, VA (US)

(73) Assignee: Codebroker, LLC, Belmont, MA (US)

( * ) Notice: Subject to any disclaimer, the term of this patent is extended or adjusted under 35 U.S.C. 154(b) by 54 days.

(21) Appl. No.: 13/952,526

(22) Filed: Jul. 26, 2013

(51) Int. Cl.
*G06F 15/16* (2006.01)
*G06Q 30/02* (2012.01)

(52) U.S. Cl.
CPC .................................. *G06Q 30/0243* (2013.01)

(58) Field of Classification Search
CPC ....................... H04L 29/08072; G06Q 30/0236
USPC ................................ 709/217, 218; 705/14.36
See application file for complete search history.

(56) References Cited

U.S. PATENT DOCUMENTS

| 7,548,754 | B2 | 6/2009 | Shivaram et al. | |
|---|---|---|---|---|
| 7,769,634 | B2 | 8/2010 | Leung et al. | |
| 8,751,298 | B1 * | 6/2014 | Giordano et al. | 705/14.38 |
| 2004/0128197 | A1 * | 7/2004 | Bam et al. | 705/14 |
| 2006/0167753 | A1 | 7/2006 | Teague et al. | |
| 2008/0021909 | A1 * | 1/2008 | Black et al. | 707/100 |
| 2012/0022944 | A1 | 1/2012 | Volpi | |
| 2014/0095287 | A1 * | 4/2014 | Whitney | 705/14.26 |
| 2014/0297392 | A1 * | 10/2014 | Moffitt | 705/14.38 |

* cited by examiner

*Primary Examiner* — Andy Ho
(74) *Attorney, Agent, or Firm* — Patent GC LLC (57) ABSTRACT

Multiple copies of the same coupon are delivered to a consumer simultaneously via different delivery channels. After one copy of the coupon has been presented in connection with a transaction and used, the coupon is marked as used with respect to all delivery channels for that consumer. Different copies of the coupon can have different coupon identifiers, for example when delivered through different channels. Consumers also can access such multichannel coupons without having to login each time they wish to access their coupons from multiple channels. In one implementation, each consumer has a user profile. A promotion is associated with that consumer's user profile. Each user profile also is associated with different channel identifiers representing communication channels to deliver instances of the promotion to the consumer. Each delivered instance of the promotion includes a coupon identifier associated with the promotion.

13 Claims, 9 Drawing Sheets

┌─ 800 User Profile

| 802 | 804 | 806 | 808 | 810 | 812 |
|---|---|---|---|---|---|
| ID | Name | Address | City | Zip | Other |

┌─ 820 User/Channel Association

| 822 | 824 |
|---|---|
| ID | Channel ID 1 |
| 826 | 828 |
| ID | Channel ID 2 |

┌─ 840 Coupon Table

| 842 | 844 | 846 | 848 | 850 |
|---|---|---|---|---|
| ICUID | Start date | End date | Other | Other |

┌─ 860 User/Coupon Association

| 862 | 864 |
|---|---|
| ID | ICUID 1 |
| 866 | 868 |
| ID | ICUID 2 |

┌─ 880 Coupon Identifier Table

| 882 | 884 | 886 |
|---|---|---|
| ICUID | Channel ID | Coupon ID |

DELIVERING PROMOTIONS ASSOCIATED WITH USER PROFILES THROUGH MULTIPLE DIGITAL CHANNELS ASSOCIATED WITH THE USER PROFILES

BACKGROUND

In modern commerce, retailers and manufacturers distribute promotions, such as coupons or other advertisements for goods or services, in electronic form to consumers. Various technologies are available to control how consumers access and use these electronic promotions. For example, users may log in to a website with which they have registered to access and print a coupon. Retailers may deliver promotions through a variety of different digital delivery channels such as text messaging (e.g., short messaging service or "SMS"), software applications for mobile devices, electronic mail ("email"), social media delivery (e.g., through "Facebook"), and the like.

Generally speaking, there are two types of coupons: limited use and unlimited use. An unlimited use coupon is similar to a promotion code that any consumer can give to a retailer. The retailer accepts the promotion code an unlimited number of times from an unlimited number of consumers, so long as each consumer presenting the promotion code meets the promotional requirements.

Limited use coupons on the other hand, may not be used an unlimited number of times. A paper-based manufacturer's coupon is an example of a coupon that is intended to be limited use. Only one consumer can use the coupon only one time, because the consumer hands over the coupon to a retailer in order to use it. With digital coupons, one-time use digital coupons have become more popular because they limit the liability of the coupon issuer in much the same way as paper coupons, but they are much easier and less expensive to create and distribute than paper coupons.

With today's technologies, merchants such as retailers typically deliver one coupon to a given consumer via each delivery channel. Each coupon that is delivered to a consumer generally is treated within any coupon delivery system as a different one-time use coupon. As a result, when delivering one-time use coupons, a retailer generally delivers a given coupon to a consumer via one of the multiple preferred delivery channels for which the retailer has information for that consumer. The retailer typically does not deliver a coupon via more than one channel so that a given consumer does not receive more than one instance of a redeemable coupon, so as to limit the coupon issuer's liability. Should the retailer decide to deliver a different one-time use coupon to a consumer via each preferred delivery channel, the retailer would be increasing their potential coupon liability.

To ensure that a coupon is delivered once to a consumer, some retailers have consumers log-in to a central server to access their coupons each time they need to access a coupon. For example, the consumer might click a link in an email and then be prompted to sign-in to see their coupons. As another example, a consumer's smartphone application might have consumers login to their accounts to see their coupons.

Such techniques for coupon delivery can create a number of consumer experience problems. For example, the consumer may be required to log in each time prior to viewing a coupon or determining its status. Logging in can take time, hold up checkout lines, and be inconvenient if the consumer has forgotten their username or password. Similarly, it may be possible for a consumer to automatically see their coupons when they launch a smartphone application because they are already logged in, but they will not be able to easily view their coupons via email and may not know how to do so.

SUMMARY

This Summary introduces selected concepts in simplified form that are further described below in the Detailed Description. This Summary is intended neither to identify key or essential features of the claimed subject matter, nor to limit the scope of the claimed subject matter.

Consumers generally have multiple devices and multiple applications on each device through which they can receive information about promotions. Because it is commercially beneficial to make it easy for a consumer to use a promotion to purchase a good or a service, multiple copies of the same coupon may be delivered to a consumer simultaneously via different delivery channels. After one copy of the coupon has been presented and used in connection with a transaction, the coupon can be marked as used with respect to all delivery channels for that consumer. To provide a better user experience, this functionality can be implemented so that consumers can access such multichannel coupons without having to login each time they wish to access their coupons from multiple channels.

For a one-time use coupon, when a copy of the coupon is presented and used at a retailer, the coupon is considered redeemed with respect to all delivery channels for that consumer, and the consumer can be prevented from presenting and using other copies of the coupon.

For a multiple, but limited, use coupon, when a copy of the coupon is presented and used at a retailer, the coupon is considered presented and used once with respect to all delivery channels for that consumer. As the consumer presents and uses other instances of the coupon, such uses also are counted as a use with respect to all delivery channels, until the limit on the number of uses is reached.

To provide such functionality, in one implementation, each consumer to whom coupons are delivered has a user profile. If a consumer is authorized to receive a promotion, that the promotion is associated with that consumer's user profile. Each user profile also is associated with different channel identifiers which represent the communication channels through which instances of a promotion associated with that user profile can be delivered to the consumer.

To deliver an instance of a promotion through a communication channel, data identifying the promotion is communicated through the communication channel. For example, a uniform resource locator or identifier, e.g., a URL, can be delivered via the communication channel to the consumer. When the consumer activates the link on the consumer's device, the device sends a message to the coupon delivery system, which looks up the associated profile and delivery channel, locates the associated coupon, and presents an instance of that promotion without further data entry by the user. As another example, an application programming interface of an application can communicate with the coupon delivery system to exchange data to access the promotion.

When an instance of a promotion is delivered, it contains a coupon identifier that will allow a coupon clearing system to uniquely associate that instance of the promotion with the consumer and the promotion. The coupon identifier can be, for example, rendered as a barcode or stored in a form allowing it to be processed at a point of sale, such as through delivery to the point of sale from a consumer device by radio transmission. This coupon identifier also can be unique for each channel identifier for a consumer. Even with coupon identifiers that are unique per channel for each user, each use of an instance of the promotion is treated as a use of that promotion across all channels for the user.

In various aspects, such techniques can be embodied as a computer-implemented process, one or more computers, and a computer program product including computer storage encoded with computer program instructions, and can be implemented in a distributed computing environment.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section describes an example operating environment for implementing a system supporting distribution of copies of a single promotion through multiple channels.

Figure 1:
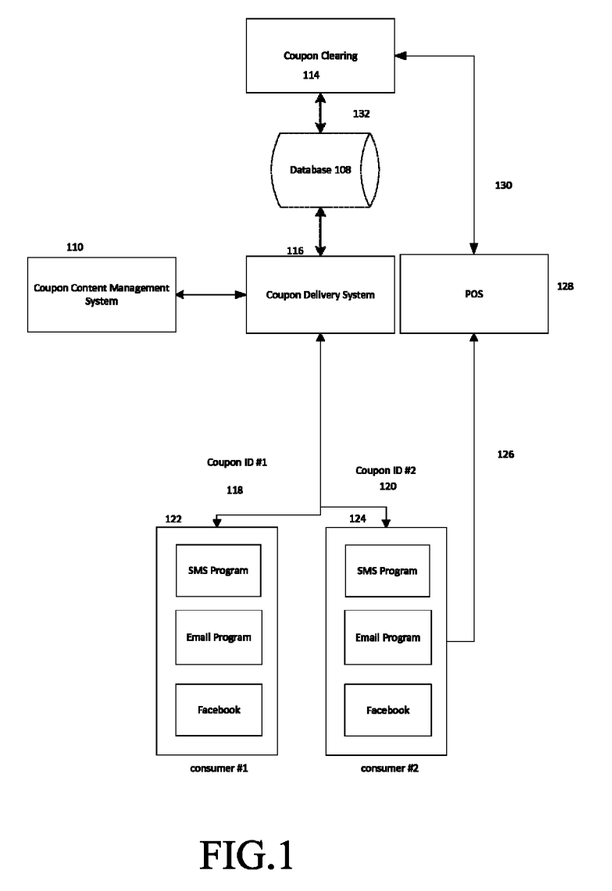
FIG. 1 is a block diagram of an example system supporting distribution of a single promotion through multiple channels.

Referring to FIG. 1, a promotion system includes a database 108. This database associates, as described in more detail below in connection with FIGS. 5 and 8, user profiles with promotions, channels and coupon identifiers. The system also includes a coupon content management system 110. The coupon content management system 110 includes various media that is used to generate a rendering of an instance of a coupon, such a graphics, text, and the like. Such information generally is associated with a promotion identifier for each promotion. A content delivery system 116 uses the database 108 to determine which instances of promotions to deliver to consumers, and their associated coupon identifiers, and uses coupon content management system 110 to provide data, such as media and text, to deliver with coupon identifiers to a consumer device.

The content delivery system 116, database 108 and coupon content management system 110 can be implemented as one or more computer systems that are programmed to implement the functionality such as described herein. An example computer system that can be used is described in more detail below in connection with FIG. 9. In addition, the database 108 and coupon content management system 110 include databases of information that can be implemented using storage and a database management system, such as a commercially available relational database.

Note that the database 108, content management system 110 and content delivery system 116 can be implemented for one or more multiple retailers or manufacturers or other entity. In some implementations each entity may have its own database 108, coupon content management system 110 and content delivery system 116. Different entities may be responsible for managing the different systems 108, 110 and 116.

The coupon management system 110 can provide the data representing coupons (such as images and text) to the coupon delivery system 116 over a computer network. Similarly, the database 108 can be accessible to the coupon delivery system over a computer network. Alternatively, one or more of the systems 108, 110 and 116 can reside on the same computer system.

As described in more detail below in connection with FIG. 8, the database 108 maintains information associating coupon identifiers for promotions with user profiles for consumers, and information associating user profiles for consumers with channel identifiers identifying the communication channels through which coupons can be delivered to those consumers. Various operations can be made available in the content delivery system 116 to add, modify and remove associations between user profiles and coupon identifiers, and between user profiles and channel identifiers, as described in more detail below in connection with FIGS. 2-7.

The coupon delivery system 116 delivers coupons with coupon identifiers, e.g., coupon identifier #1 118 and coupon identifier #2 120, to consumer devices 122, 124 (e.g., consumer #1 and consumer #2) through multiple channels, e.g., text messaging, email and social media. Generally, each delivered instance of a coupon has a coupon identifier that uniquely identifies the coupon as related to a particular promotion and a particular consumer, and optionally other information, such as the channel over which the promotion is to be delivered, and typically is rendered as a barcode on the consumer device.

While FIG. 1 only shows one consumer device 122, 124 per consumer, there can be multiple consumers, each with multiple consumer devices. Each consumer device for a consumer can have multiple channels, and the channels available on all of the consumer devices can be the channels available for that consumer. As an example, a consumer may have email and web access on a desktop computer, an application and text messaging and web access on a mobile device. Such devices generally are implemented using a form of computing device such as described below in connection with FIG. 9.

After instances of coupons are delivered to a consumer over the communication channels for that consumer, the consumer can present 126 one of the instances of the coupon to a point of sale system 128 in connection with a transaction. For example the coupon identifier for the coupon can be rendered as a barcode which is read at the point of sale. Alternatively, the coupon identifier can be conveyed to the point of sale through other techniques, such as radio transmission over NFC or other connection.

The point of sale system 128 collects information about a presented coupon and the associated transaction, and communicates with a coupon clearing system 114. The coupon clearing system determines whether the coupon is valid and can be used in connection with the transaction.

In this example, the coupon clearing system 114 receives the coupon identifier presented at the point of sale and looks up in database 108 whether the coupon identifier is valid. Alternatively, the coupon clearing system can provide the coupon identifier to the database 108 to perform such reconciliation. The coupon clearing system 114 and the database 108 may be local or remote to the point of sale and each other, and typically are connected over a computer network, such as the internet or a private wide area or local area network. They also may all reside on the same computer. The information from the database 108 allows the coupon clearing system 114 to report to the POS system 128 whether an instance of a coupon that has been presented to the POS system is valid, and optionally other information about the promotion.

After the coupon clearing system reports whether the coupon is valid, the point of sale system 128 can apply the promotion to the transaction. The information about the use of the coupon can further be used to mark the coupon as used in database 108, and if all of the uses of the coupon have been consumed, the coupon is marked as redeemed so that it cannot be used again. As will be described in more detail below, the information about presentation, use and redemption of a coupon is applied across all instances of the coupon, regardless of the distribution channel over which an instance of the coupon was delivered to the consumer. In other words, this information for a coupon is applied across all delivery channels for the consumer, even when different instances of the same coupon delivered across through different digital channels have different coupon identifiers associated with them, by virtue of having the different coupon identifiers associated with the same promotion identifier and the promotion identifier being associated with the user profile.

The coupon clearing system 114, coupon delivery system 116 and point of sale system 128 also typically are implemented using one or more computing devices such as described below in connection with FIG. 9.

Given this context, an example implementation will be described in more detail in connection with FIGS. 2-8.

Figure 8:
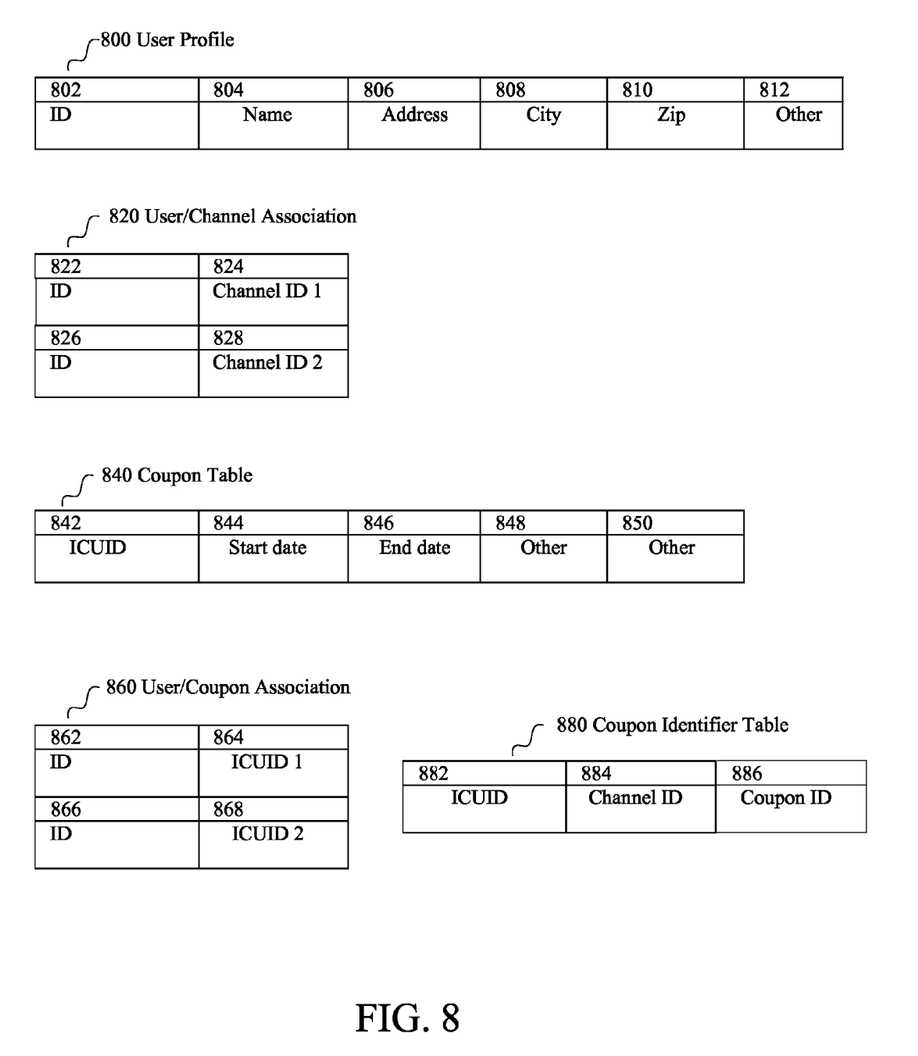
FIG. 8 is an illustration of an example implementation of database tables for associating promotions, user profiles and communication channels.

Referring to FIG. 8, an example implementation of database tables used to store information about consumers, and promotions and communication channels associated with them, will now be described.

A first table 800 stores user profiles. Each user profile has a user identifier 802 and various data fields associated with it. Such data fields, in this example, include information about a consumer such as, a name 804, address 806, city 808, zip 810, and other information 812. This example is merely illustrative and not limiting as such a database can have multiple structures and tables for storing various information about consumers.

A second table 820 associates user profiles with channel identifiers. A channel identifier indicates a communication channel with which the system can communicate with a consumer. For example, the channel identifier can be a mobile phone number for text messages, a username for a Facebook or other social media account, an email address, or an application identifier for an application on a mobile device such as a smart phone. In this second table 802, each row includes a user identifier 822 and a channel identifier 824. Multiple rows for each consumer provide the set of relationships between the consumer and multiple channel identifiers for the user. This example is merely illustrative and not limiting as such a database can have multiple structures and tables for storing information associating user profiles with channels.

A coupon table 840 provides information about coupons. For example, a promotion identifier 842 (also called herein an ICUID, for internal coupon unique identifier) identifies a promotion. This promotion identifier is generally unique per promotion for a merchant. Various information about the promotion can be stored, such as a start date 844, end date 846, presentation and use information 848 and any other information 850. This example is merely illustrative and not limiting as such a database can have multiple structures and tables for storing various information about promotions.

Another table 860 associates consumers with promotions by associating the user identifier for the consumer with the promotion identifier or ICUID for the promotion. In particular, for each promotion associated with a consumer there is a row that includes the user identifier 862 and the promotion identifier 864. This table can include use and redemption data for the promotion for the user. This example is merely illustrative and not limiting as such a database can have multiple structures and tables for storing information associating user profiles with promotions.

A coupon identifier table 880 then is used to associate coupon identifiers, or "coupon ID", which can be rendered as barcodes, to promotions that are associated with consumers. In particular, the coupon identifier table associates a promotion identifier 882 (e.g., 842 in table 840) with a channel identifier 884 for a consumer (e.g., 824 in table 820) with a coupon identifier (coupon ID) 886, such as a barcode, for the instance of the coupon sent to the consumer through the associated channel identifier. The coupon identifier is unique per consumer per promotion. The coupon identifier might also be unique per delivery channel. Even when unique per delivery channel, the use and redemption information is tracked per user per promotion, thus allowing multiple instances of the same promotion to be delivered to the same consumer with different coupon identifiers. This example is merely illustrative and not limiting as such a database can have multiple structures and tables for storing information associating promotion identifiers with coupon identifiers.

The foregoing example is one way of associating user profiles, channel identifiers and promotion identifiers, so as to associate communication channels with consumers and promotions.

Given such an example implementation, a variety of example implementation for operations for creating user profiles, associating promotions with consumers, associating communication channels with consumers, and delivering promotions will now be described.

Figure 2:
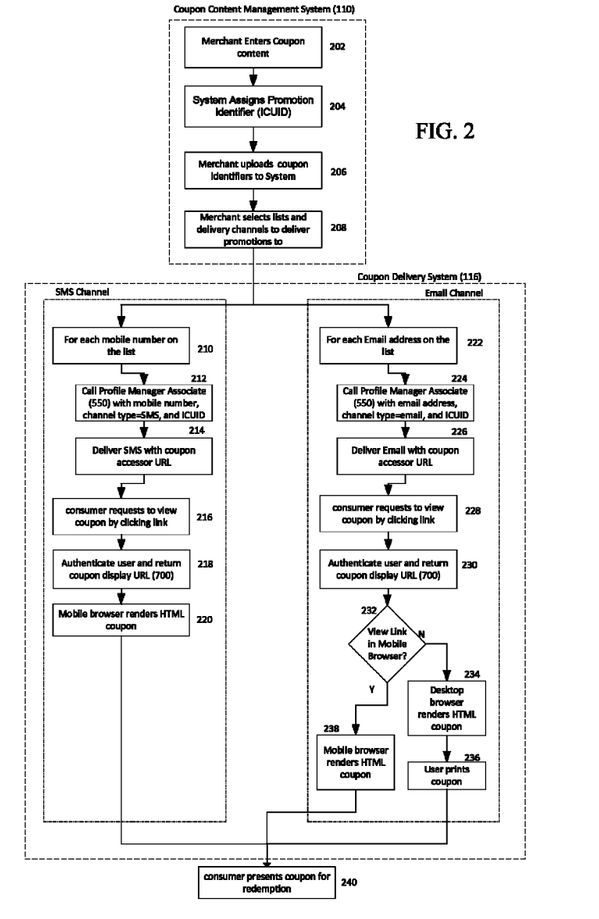
FIG. 2 is a flow chart of an example implementation of a process for coupon delivery.

Referring now to FIG. 2, an example implementation of coupon delivery will now be described. In this example, a merchant, such as a retailer or manufacturer, enters 202 coupon content for a promotion into the coupon content management system 118 (FIG. 1). The system assigns (204) a promotion identifier (ICUID) to a promotion. Coupon identifiers (coupon IDs) can be uploaded 206 into the system as well. The merchant also selects 208 lists of consumers, by identifying user profiles, to whom promotions will be delivered, and delivery channels through which instances of promotions will be delivered.

Using this information, the coupon delivery system 116 delivers the coupons to consumers through multiple channels. In FIG. 2, the example channels are text messaging and email.

Thus, for each mobile number (as indicated at 210) associated with one of the consumers on the list selected by the merchant, the mobile number, channel type and ICUID are associated 212 with the user profile. This operation is herein called "profile manager associate" which is called by a computer program implementing the coupon delivery system. This operation is described in more detail below in connection with FIG. 5. The coupon is then delivered 214 by sending a text message to the mobile number with data, such as a uniform resource locator (URL) or other data that can be used to access the coupon. The consumer requests 216 to view the coupon on their mobile device by using the received data, such as by activating the URL through a touch screen or other action. The coupon delivery system authenticates the user (700). Any manner of authentication can be used. Preferably, such authentication can occur without the user logging in to a server. For example, the authentication can use a channel identifier received in the request, such as a mobile number, to verify that the channel identifier relates to a user profile authorized to receive the coupon. After authentication, the coupon delivery system returns the coupon display data, which includes the coupon ID, which is then rendered 220 by a browser on the mobile device.

Additionally, for each email address (as indicated at 222) associated with one of the consumers on the list selected by the merchant, the email address, channel type and ICUID are associated 224 with the user profile. This operation is herein called "profile manager associate" which is called by a computer program implementing the coupon delivery system. This operation is described in more detail below in connection with FIG. 5. The coupon is then delivered 226 by sending a message to the email address with data, such as a uniform resource locator (URL) or other data that can be used to access the coupon. The consumer requests 228 to view the coupon on a device by using the received data, such as by activating the URL through a touch screen or mouse click or other action. The coupon delivery system authenticates 230 the user (700), and returns the coupon display data, which includes the coupon ID for this consumer's instance of this promotion on this delivery channel. The display data returned can be a function of any detected device of the consumer. For example, if the coupon is to be displayed on a mobile device, as determined at 232, then the data returned is rendered 238 by a browser on the mobile device. Or the data can be rendered by a desktop browser, as indicated at 234, where the user can print 236 the coupon.

After the coupons are delivered to the user, the user can present 240 the coupon for use in connection with a transaction at a point of sale. The consumer can select for presentation the instance of the coupon from the mobile device as accessed by the text message, or as printed from a desktop application, or as displayed in a browser on their mobile device.

Figure 3:
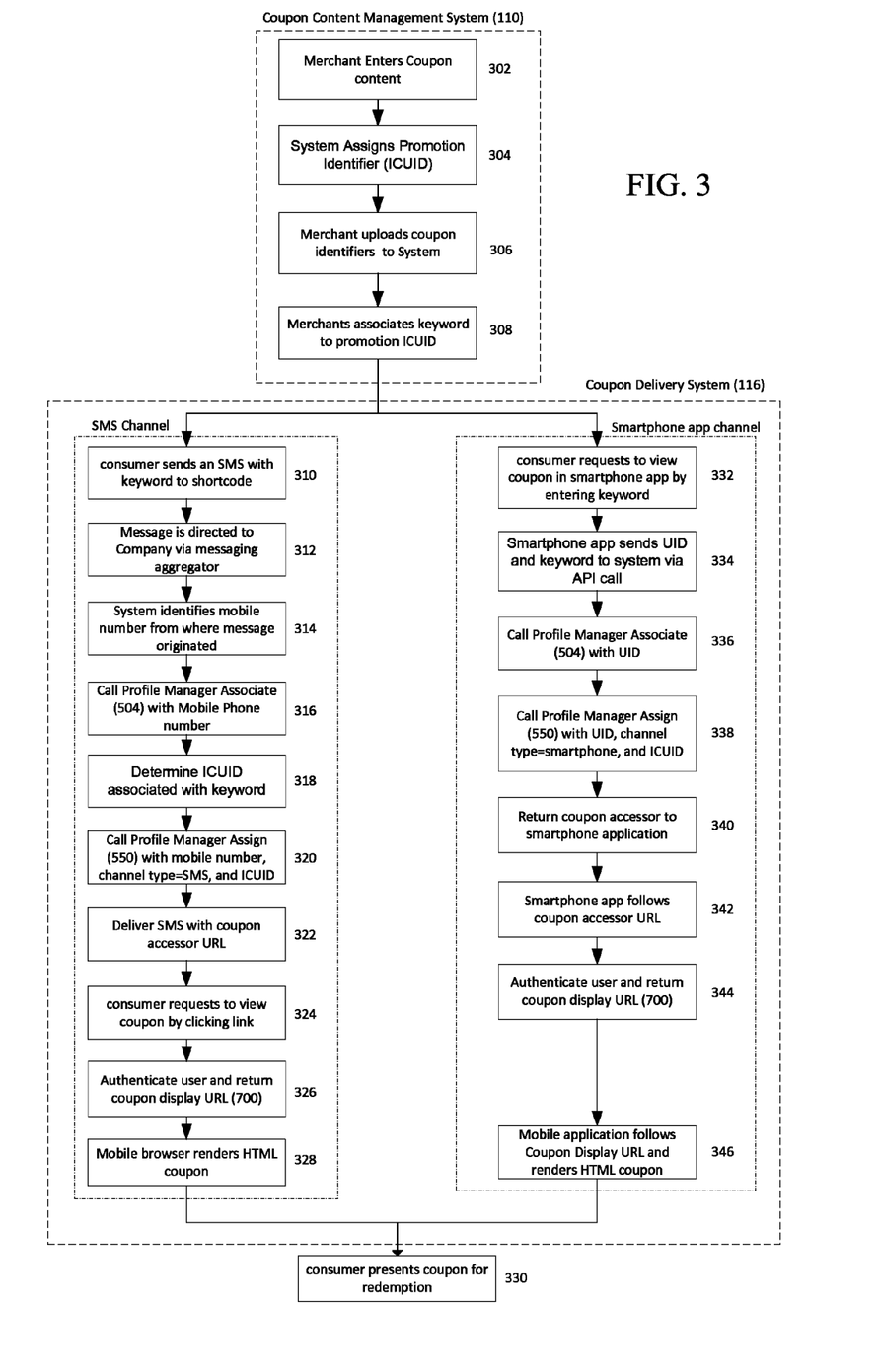
FIG. 3 is a flow chart of an example implementation of a process for coupon delivery.

Another implementation is shown in FIG. 3. In this example, a merchant, such as a retailer or manufacturer, enters 302 coupon content for a promotion into the coupon content management system 110 (FIG. 1). The system assigns (304) a promotion identifier (ICUID) to a promotion. Coupon identifiers (coupon IDs) can be uploaded 306 into the system as well. The merchant also selects a keyword that is associated 308 with one or more promotion identifiers. Using this information, the coupon delivery system 116 delivers the coupons to the consumer through multiple channels when requests are received from the consumer over those channels using the appropriate keyword. In FIG. 3, the example channels are text messaging and one or more smartphone applications.

In this example, using the SMS text messaging system, a consumer sends, and the system receives 310, an SMS text message including a keyword directed to a shortcode. The message, which includes a mobile number and keyword, is directed 312 to the coupon delivery system through a message aggregation system. The system identifies 314 the mobile number from which the message originated. This mobile number is then associated 316 with a user profile, as described below in connection with FIG. 5. The promotion identifier associated with the received keyword is then identified 318. The user profile associated with the received mobile number is then associated 320 with the promotion identifier associated with the keyword, as described below in connection with FIG. 5. The coupon is then delivered 322 by sending a text message to the mobile number with data, such as a uniform resource locator (URL) or other data that can be used to access the coupon. The consumer requests 324 to view the coupon on their mobile device by using the received data, such as by activating the URL through a touch screen or other action. The coupon delivery system authenticates 326 the user (700), and returns the coupon display data including the coupon ID, which is then rendered 328 by a browser on the mobile device.

Similarly, using the smartphone application, the smartphone application receives 332 a keyword as part of a request from a consumer, using the application, to view a coupon. The smartphone sends, and the system receives 334, a call through the application's application programming interface (API) which is a request to view a coupon, which request includes a keyword and an identifier of the application. The identifier of the application is then associated 336 with a user profile, as described below in connection with FIG. 5. The promotion identifier associated with the received keyword is then identified. The user profile associated with the received application identifier is then associated 338 with the promotion identifier associated with the keyword, as described below in connection with FIG. 5. Data to access the coupon is then delivered 340 to the smartphone application, such as a uniform resource locator (URL) or other data that can be used to access the coupon. The consumer requests 342 to view the coupon using the application by using the received data, such as by activating the URL through a touch screen or other action. The coupon delivery system authenticates 344 the user (700), and returns the coupon display data including its coupon ID, which is then rendered 346 on the mobile device.

After the coupon is delivered to the user, the user can present 330 the coupon for use in connection with a transaction at a point of sale. The consumer can select for presentation the instance of the coupon from the mobile device as accessed by the text message, or as displayed in a browser on their mobile device. Note that using this process, if the consumer has both a smartphone application identifier and a mobile number associated with their user profile, then they will receive the same coupon they received in the smartphone application when they request the coupon by text.

Figure 4:
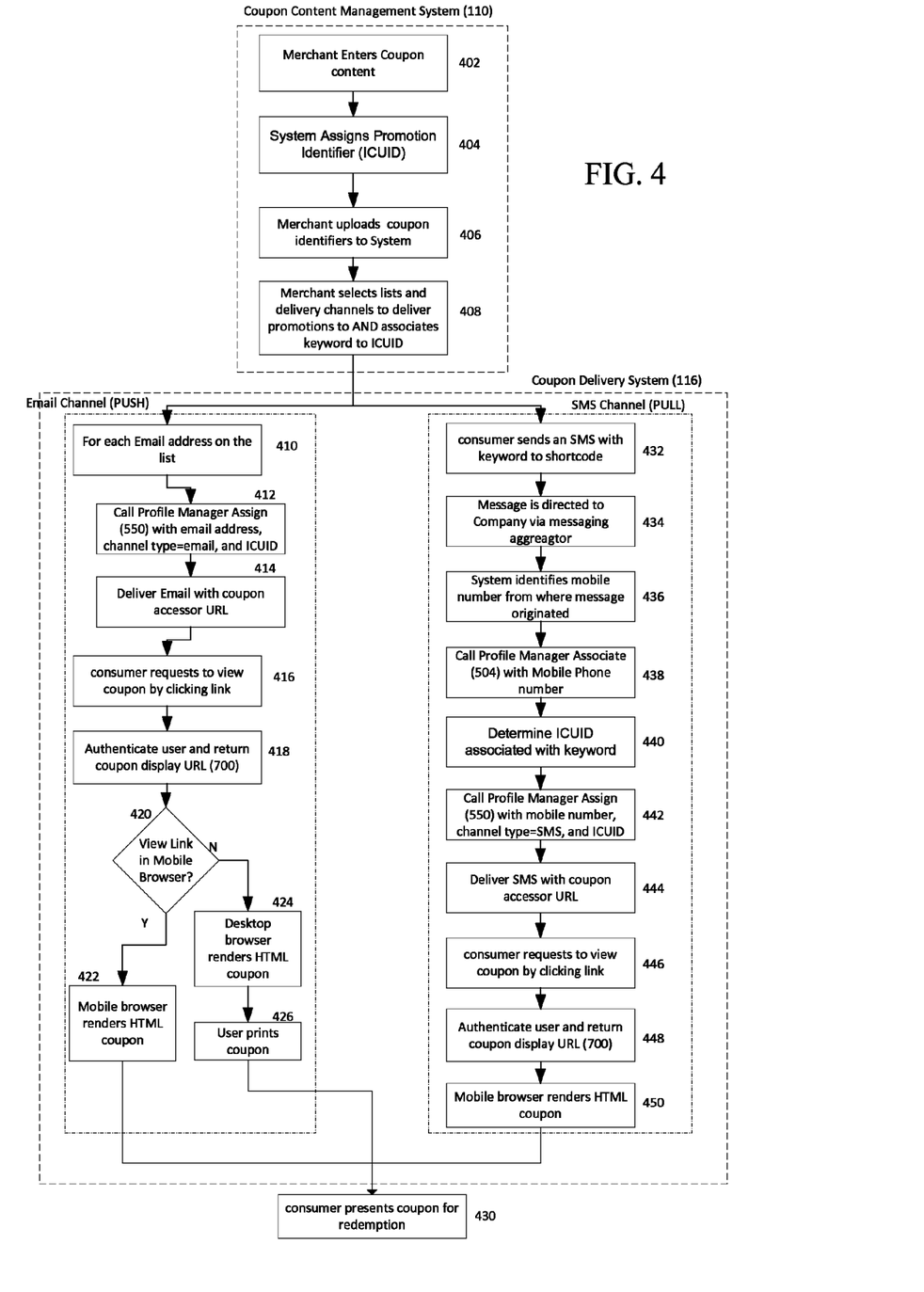
FIG. 4 is a flow chart of an example implementation of a process for coupon delivery.

Another implementation is shown in FIG. 4. In this example, a coupon can be pushed to a consumer, or a consumer can pull the coupon, i.e., request the coupon. Using either channel to access the promotion, the consumer has the same promotion associated with their user profile. As a specific example, a merchant can distribute a coupon to several registered users, which have user profiles associated with an email address. The merchant could also advertise that the same promotion is available, and a coupon can be received by a consumer by texting a keyword to the merchant. In this example, if a user is sent the coupon by email, and then requests the same coupon by submitting the keyword by text, the user has the same coupon associated with their user profile.

In this example, a merchant, such as a retailer or manufacturer, enters 402 coupon content for a promotion into the coupon content management system 118 (FIG. 1). The system assigns (404) a promotion identifier (ICUID) to a promotion. Coupon identifiers (coupon IDs) can be uploaded 406 into the system as well. The merchant selects 408 lists of user profiles and delivery channels and associates 408 a keyword with one or more promotion identifiers. Using this information, the coupon delivery system 116 delivers the coupons to the consumer through multiple channels, by sending a message through a selected delivery channel (such as email) and when requests are received from the consumer over another delivery channel (such as through text messaging using the appropriate keyword). In FIG. 4, the example channels are email and text messaging.

Figure 5:
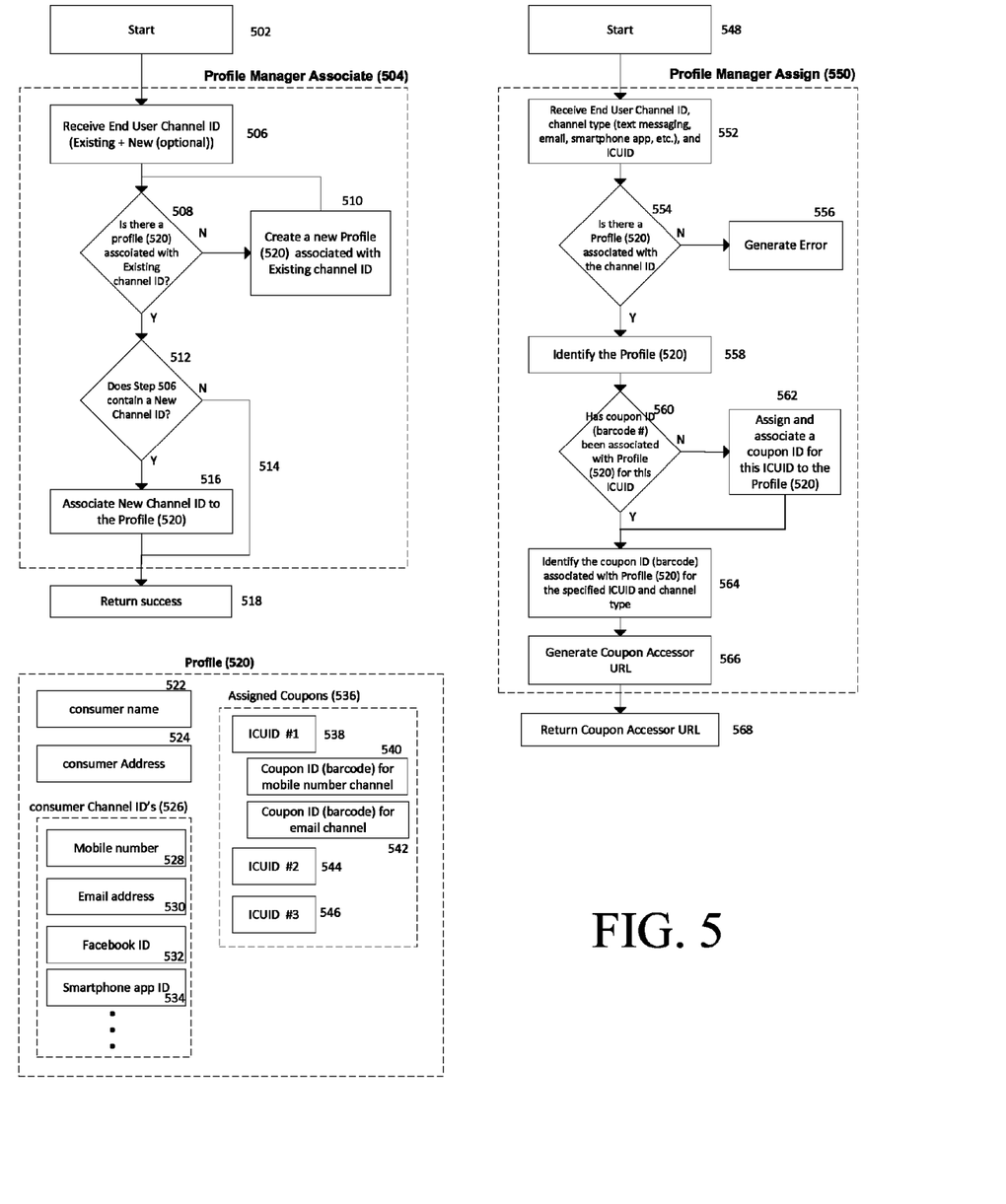
FIG. 5 is a flow chart of an example implementation of profile management.

In FIG. 4, for each email address (as indicated at 410) associated with one of the consumers on the list selected by the merchant, the email address, channel type and promotion identifier (ICUID) are associated 412 with the user profile, as described in more detail below in connection with FIG. 5. The coupon is then delivered 414 by sending a message to the email address with data, such as a uniform resource locator (URL) or other data that can be used to access the coupon. The consumer requests 416 to view the coupon on a device by using the received data, such as by activating the URL through a touch screen or mouse click or other action. The coupon delivery system authenticates 418 the user (700), and returns the coupon display data including its coupon ID. The display data returned can be a function of any detected device of the consumer. For example, if the coupon is to be displayed on a mobile device, as determined at 420, then the data returned is rendered 422 by a browser on the mobile device. Or the data can be rendered by a desktop browser, as indicated at 424, where the user can print 426 the coupon.

Using the SMS text messaging system, a consumer sends, and the system receives 432, an SMS text message including a keyword directed to a shortcode. The message is directed 434 to the coupon delivery system through a message aggregation system. The system identifies 436 the mobile number from which the message originated. This mobile number is then associated 438 with a user profile, as described below in connection with FIG. 5. The promotion identifier associated with the received keyword is then identified 440. The user profile associated with the received mobile number is then associated 442 with the promotion identifier associated with the keyword, as described below in connection with FIG. 5. The coupon is then delivered 444 by sending a text message to the mobile number with data, such as a uniform resource locator (URL) or other data that can be used to access the coupon. The consumer requests 446 to view the coupon on their mobile device by using the received data, such as by activating the URL through a touch screen or other action. The coupon delivery system authenticates 448 the user (700), and returns the coupon display data including its coupon ID, which is then rendered 450 by a browser on the mobile device.

After the coupons are delivered to the user, the user can present 430 the coupon for use in connection with a transaction at a point of sale. The consumer can select for presentation the instance of the coupon from the mobile device as accessed by the text message, or as printed from a desktop application, or as displayed in a browser on their mobile device. Note that using this process, if the consumer has both an email address and mobile number associated with their user profile, then they will receive the same coupon they received by email when they request the coupon by text.

Generally speaking, the coupon delivered to the consumer includes the coupon identifier (coupon ID), such as a barcode, that can be received by a point of sale system when the coupon is presented in connection with a transaction. Such barcodes can be rendered and displayed and processed using conventional techniques. Also, in some embodiments, it is possible to implement the delivery system such that any first instance of the promotion that has been delivered is invalidated if the second instance of the promotion is delivered through another communication channel.

An example implementation of an association of coupons, channel identifiers and user profiles will now be described in connection with FIG. 5. The implementation of FIG. 5 provides an association of data shown at 520, a more detailed implementation of which also is described above in connection with FIG. 8. As shown at 520, a user profile includes information about a consumer, such as a name 522 and address 524. For each consumer, this user profile is associated with a plurality of consumer channel identifiers 526, such as a mobile number 528, email address 530, Facebook or other social media user identifier 532, and smartphone application identifier 534. It should be understood that any channel, through which the consumer can be contacted to deliver a coupon or through which the consumer can request a coupon, can have a channel identifier associated with it and the invention is not limited to the kinds of channels and channel identifiers noted here. A user profile can include multiple channel identifiers for the same channel type (e.g., multiple email addresses or mobile device numbers or smartphone application identifiers). Each of these channel identifiers identifies a communication channel through which communication between the coupon delivery system and the consumer can occur to deliver a coupon. For each consumer, the user profile also is associated with assigned coupons 536. This example shows promotion identifiers (ICUID) 538, 544 and 546 associated with the user profile 520. A promotion identifier is associated with different coupon identifiers (coupon ID) for each user, which also can be different for each channel for each user, such as a coupon ID for a mobile channel 540 and a coupon ID for the email channel 542. These different coupon IDs for each channel are nonetheless processed as the same promotion.

The "profile manager associate" operation 504 starts 502 through a call to this operation. The parameters received 506 include an existing channel identifier and optionally one or more new channel identifiers. If there is no profile associated with the received channel identifier, as determined at 508, a new profile is created 510 with the received channel identifier. Otherwise, the profile associated with the received channel identifier is identified. If a new channel identifier is also received, as determined at 512, the new channel identifier is associated 516 with the identified profile. These steps can be repeated for additional channel identifiers. Success is then returned as indicated at 518. As an example, an application identifier for a smartphone application can be received along with a mobile phone number. The user profile associated with the mobile phone number can be identified and then updated to include the smartphone application identifier.

The "profile manager assign" operation 550 starts 548 through a call to this operation. The parameters received including a channel identifier, optionally a channel type, and a promotion identifier, as indicated at 552. If a user profile is not associated with the received channel identifier, as determined at 554, then an error is generated 556. Otherwise, the user profile is identified 558. If a coupon identifier for the received promotion identifier has not yet been associated with this user profile, as determined at 560, for example by examining table 880, then a coupon identifier for the received promotion identifier and channel identifier for this consumer and for this channel is assigned and associated with the user profile, as indicated at 562. Given the coupon identifier for the received promotion identifier and the specified channel identifier and channel type, data for accessing the coupon, such as a URL, is generated 566. This data is returned, as indicated at 568.

Figure 6:
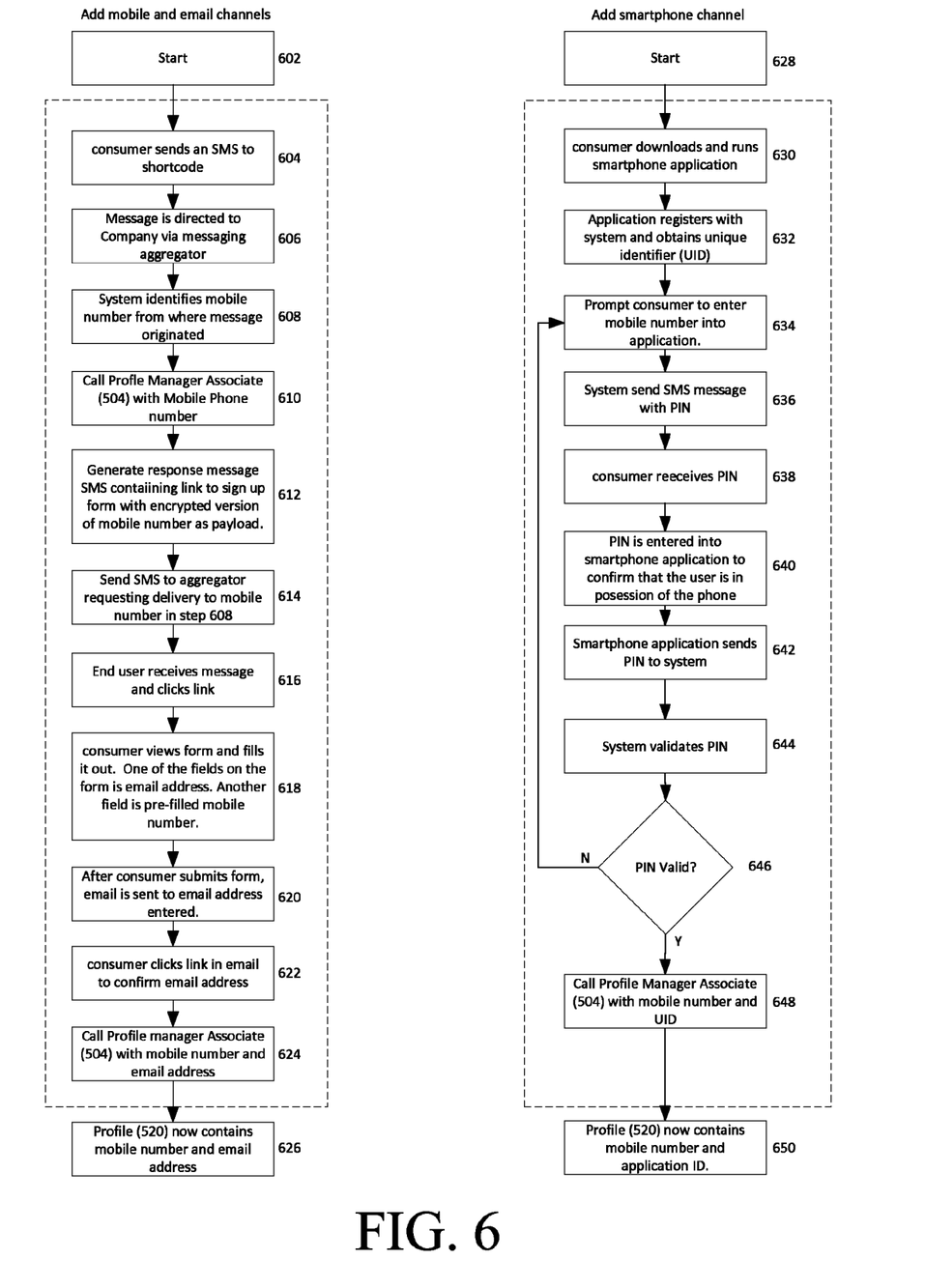
FIG. 6 is a flow chart of an example implementation of profile management.

Turning now to FIG. 6, an implementation of adding channels to a user profile will now be described in more detail.

For mobile and email channels, the process starts 602 by the consumer sending, and the system receiving 604 an SMS message to a shortcode. The message is directed 606 to the system via a messaging aggregator. The system identifies 608 the mobile number from which the text message originated. The profile manager associate operation in FIG. 5 is then called 610 with the mobile phone number. A response message containing a link, such as a URL, or other data to access a sign up form is then generated 612. The link can include, for example, information already available to the system for completing the sign up form, such as the mobile number. This message is sent 614 to the messaging aggregator for delivery to the mobile number. The consumer receives 616 this message, and then can activate the link to register. The sign up form is displayed 618, so that the consumer can complete it by providing an email address. The display can include a form with a mobile number field or other data, such as name and address, already completed. Other fields include the data to be stored as part of the user profile, in which a name and address are optional. The consumer submits the form, and it is received and processed by the system to create and store the user profile data. An email is then sent 620 to the email address submitted. A link is included in the email for the consumer to confirm the email address. The consumer clicks on this link and the message sent as a result of that operation is received 622 by the system. The "profile manager associate" operation of FIG. 5 is then called 624 to associate the mobile number and email address with the user profile for this consumer. The profile thus is associated 626 with the mobile number and email address submitted by the consumer.

Similarly to add a smartphone application as a channel for a consumer, the process starts 628 by the consumer downloading, installing and running the smartphone application, as indicated at 630. The application is registered with the system to obtain a unique identifier for the application, as indicated at 632. The application prompts 634 the user to enter the mobile number into the application. The system sends 636 an SMS message to the received mobile number, which message includes an access code, such as a PIN. The consumer receives 638 the PIN and enters 640 the PIN into the application to confirm that the user in is possession of that device. The smartphone application sends 642 the PIN to the system. The system validates 644 the PIN. If the PIN is not valid, the application can prompt the user again to enter a valid mobile number. If the PIN is valid as determined at 646, the "profile manager associate" operation is called 648 with the mobile number and identifier of the smartphone application. Thus the profile contains 650 the mobile number and smartphone application identifier.

Figure 7:
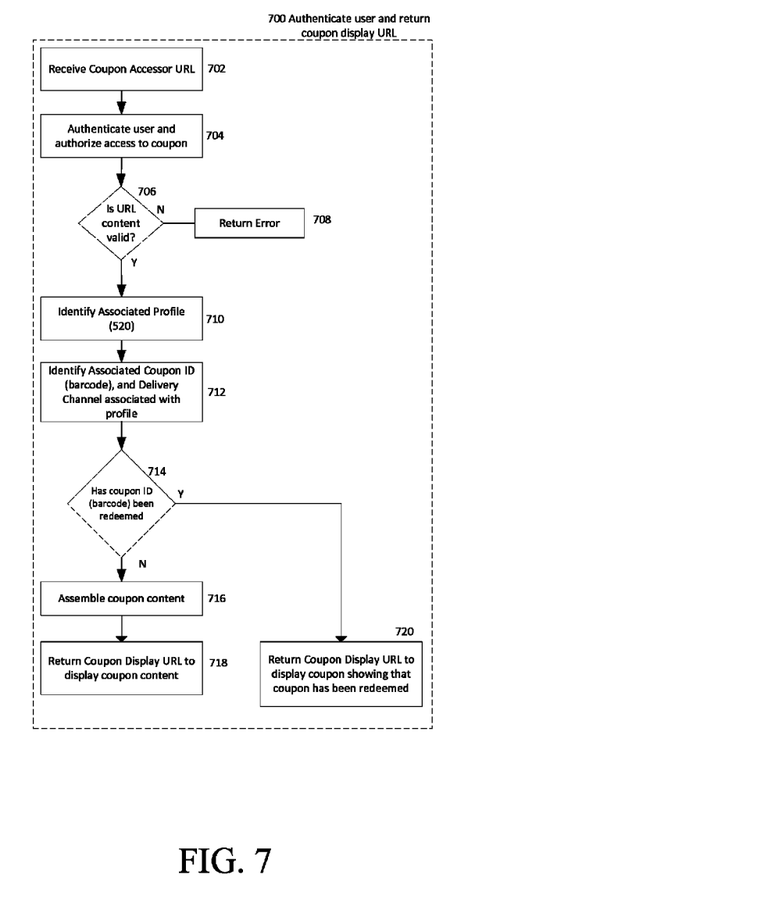
FIG. 7 is a flow chart of an example implementation of coupon delivery.

Referring now to FIG. 7, an example implementation of how the coupon delivery system can deliver an instance of a coupon will now be described. In this example, the system receives 702 a URL from a consumer device, which the consumer received and activated to access the coupon. In this example, such a URL is called a coupon accessor URL. When the system receives a coupon accessor URL from a user, the user is authenticated and access to the coupon may be authorized, as indicated at 704. The coupon accessor URL is processed to ensure it is a valid coupon accessor URL. If the URL content is not valid, as determined at 706, an error is returned 708. Otherwise, the profile associated with the received URL is identified 710. The coupon identifier (coupon ID) for the requested promotion and channel identifier for the identified profile are then identified 712. If information is available to the coupon delivery system, then it can be determined if this coupon has already been redeemed, as indicated at 714. If the coupon has been redeemed, data indicating that the coupon has been redeemed is returned, as indicated at 720. Otherwise, the content of the coupon is assembled 716 and returned 718.

Regarding the access to the redemption data, each promotion associated with a user profile can have redemption data associated with it. This redemption data can include a number of times the coupon can be and/or has been presented and used in connection with a transaction, regardless of delivery channel over which the coupon was delivered. In some instances, the coupon delivery system does not have access to the redemption data. Instead, the coupon clearing system tracks presentation, use and redemption data and determines whether the coupon is valid at the time it is presented in connection with a transaction. In this case, the coupon clearing system tracks the redemption of a coupon by a consumer, regardless of the delivery channel over which the presented coupon was delivered to the consumer. If the coupon delivery system has access to redemption data, the redemption data can be used to condition delivery of a coupon when delivery is requested.

Other conditions on delivery can be set, such as by using other information from a user profile. For example, the location of the user versus the location of a retailer can be used to limit delivery of coupons to the user. Whether the coupon is expired, or has been presented several times can be used to prevent deliver of a coupon. An action by the consumer, such as exiting or entering a location or scanning a QR code can condition delivery. A consumer may also be rewarded for performing various actions, such as completing a survey, by delivering a coupon to the consumer.

In the foregoing implementations, different instances of the same promotion associated with a user profile are delivered over multiple channels to the consumer. The coupon clearing system verifies whether the coupon is valid by accessing redemption data that is tracked for a coupon regardless of how that coupon is delivered. Thus, two instances of a promotion are treated as the same promotion if presentation and use of one of the instances of the promotion by the consumer is counted as presentation and use of the promotion with respect to all channel identifiers associated with the consumer.

It should be understood that the various implementations described above can be combined in various ways to enable different kinds of functionality for delivering different instances of the same promotion over different communication channels.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well-known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 9:
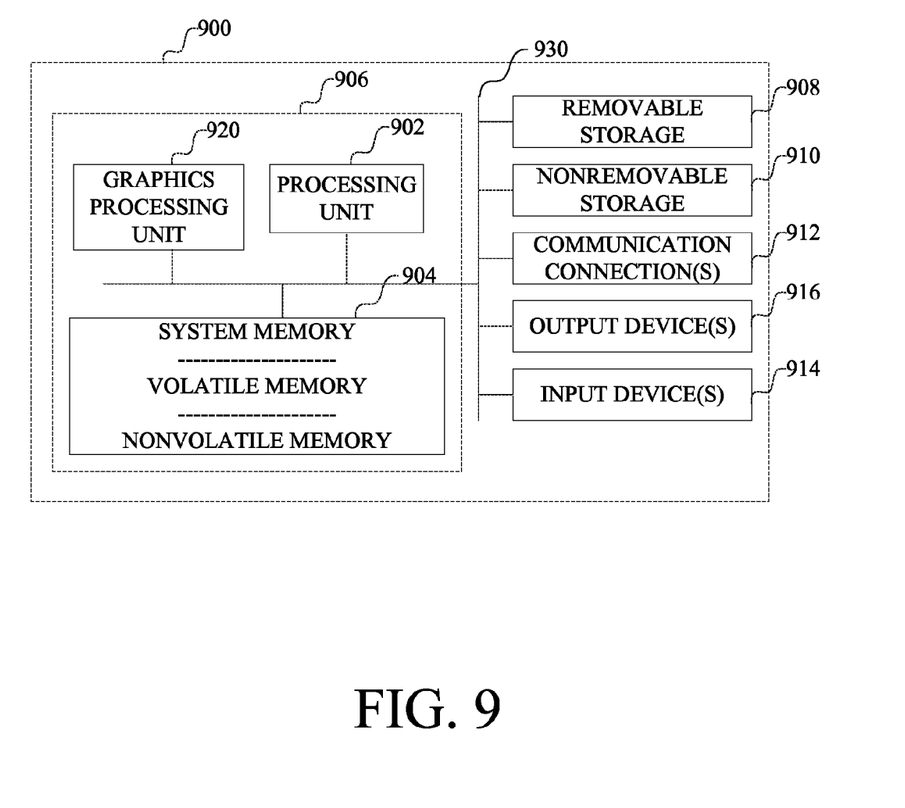
FIG. 9 is a block diagram of an example computer with which components of such a system can be implemented.

FIG. 9 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 9, an example computing environment includes a computing machine, such as computing machine 900. In its most basic configuration, computing machine 900 typically includes at least one processing unit 902 and memory 904. The computing device may include multiple processing units and/or additional co-processing units such as graphics processing unit 920. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, computing machine 900 may also have additional features/functionality. For example, computing machine 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer program instructions, data structures, program modules or other data. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information at addressable physical locations from which the information can read by computing machine 900. Any such computer storage media may be part of computing machine 900.

Computing machine 900 may also contain communications connection(s) 912 that allow the device to communicate with other devices. Communications connection(s) 912 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 900 may have various input device(s) 914 such as a keyboard, mouse, pen, camera, touch input device, and so on. Output device(s) 916 such as a display, speakers, a printer, and so on may also be included. All of these devices are well known in the art and need not be discussed at length here.

The various components in FIG. 9 are generally interconnected by an interconnection mechanism, such as one or more buses 930.

Such a system may be implemented using software, including computer-executable instructions and/or computer-interpreted instructions, such as program modules, being processed by a set of computers. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices It should be understood that the subject matter defined in the appended claims is not necessarily limited to the specific implementations described above. The specific implementations described above are disclosed as examples only.

What is claimed is:

1. A computer implemented process supporting multichannel access to promotions delivered to consumers for presentation and use of the promotions at points of sale, comprising:
   maintaining a database that associates user profiles with channel identifiers and user profiles with promotion identifiers,
   wherein each user profile includes data representing a consumer,
   wherein each channel identifier represents a communication channel for communication between a coupon management system and the consumer or a consumer and the coupon management system,
   wherein each promotion identifier is associated with data defining a promotion;
   delivering instances of the promotions associated with the user profiles using the communication channels identified by the channel identifiers associated with the user profiles, such that multiple instances of the same promotion are delivered over multiple communication channels to the same consumer;
   wherein two or more instances of a promotion are the same promotion if presentation and use of one of the instances of the promotion by the consumer is counted as presentation and use of the promotion with respect to all of the channel identifiers associated with the consumer.

2. The process of claim 1, further comprising:
   receiving data indicating that one of the instances of one of the promotions has been redeemed by one of the consumers to which the instance of the promotion was delivered over one of the communication channels,
   marking the promotion as redeemed with respect to all the instances of the promotion for the consumer with respect to all communication channels associated with the consumer.

3. The process of claim 2, wherein marking the promotion as redeemed includes storing data indicating whether the promotion has been redeemed by a consumer.

4. The process of claim 3, wherein the stored data includes a table having a plurality of rows, each row including a user identifier of a user profile, a promotion identifier of a promotion and a field including redemption status of the promotion by the consumer.

5. The process of claim 1, wherein the delivering includes delivering a first instance of a promotion to a consumer using a first communication channel, and wherein if the consumer has multiple channel identifiers associated with the consumer's user profile, in response to a request to deliver a second instance of the promotion to the consumer, determining whether the promotion has been redeemed by the consumer using the first instance of the promotion delivered through the first communication channel, and, if the promotion has not yet been redeemed by the consumer, delivering a second instance of the promotion to the consumer using a second communication channel.

6. The computer-implemented process of claim 1, wherein creating the user profile in the user profile database comprises:
- receiving a channel identifier;
- if an existing user profile in the user profile database does not include the received channel identifier, creating a user profile in the user profile database that includes the received channel identifier.

7. The computer-implemented process of claim 1, wherein associating promotions with user profiles includes:
- receiving a channel identifier;
- associating a promotion with a user profile associated with the channel identifier; and
- delivering an instance of the promotion using the channel identifier.

8. The computer-implemented process of claim 1, wherein associating promotions with user profiles includes:
- receiving a channel identifier and a promotion identifier;
- associating a promotions identified by the promotion identifier with a user profile associated with the channel identifier; and
- delivering an instance of the promotion using the channel identifier.

9. The computer-implemented process of claim 1, further comprising:
- invalidating the first instance of the promotion if the second instance of the promotion is delivered through the second communication channel.

10. The computer-implemented process of claim 1, further comprising:
- receiving a channel identifier and an indication of a related user profile; and
- adding the received channel identifier to the related user profile in the user profile database.

11. The computer-implemented process of claim 10, further comprising delivering the second instance of the promotion to the consumer using the received channel identifier.

12. The computer-implemented process of claim 1, wherein each instance of the promotion includes a coupon identifier associating the instance with the consumer and the promotion.

13. The computer implemented process of claim 12 wherein the coupon identifier further associates the instance with the communication channel used to communicate the instance of the promotion.

* * * * *